May 13, 1947. R. B. GRAY ET AL Re. 22,876
UTILIZATION OF CARGO SPACE IN SHIPS AND THE LIKE
Original Filed Dec. 15, 1942
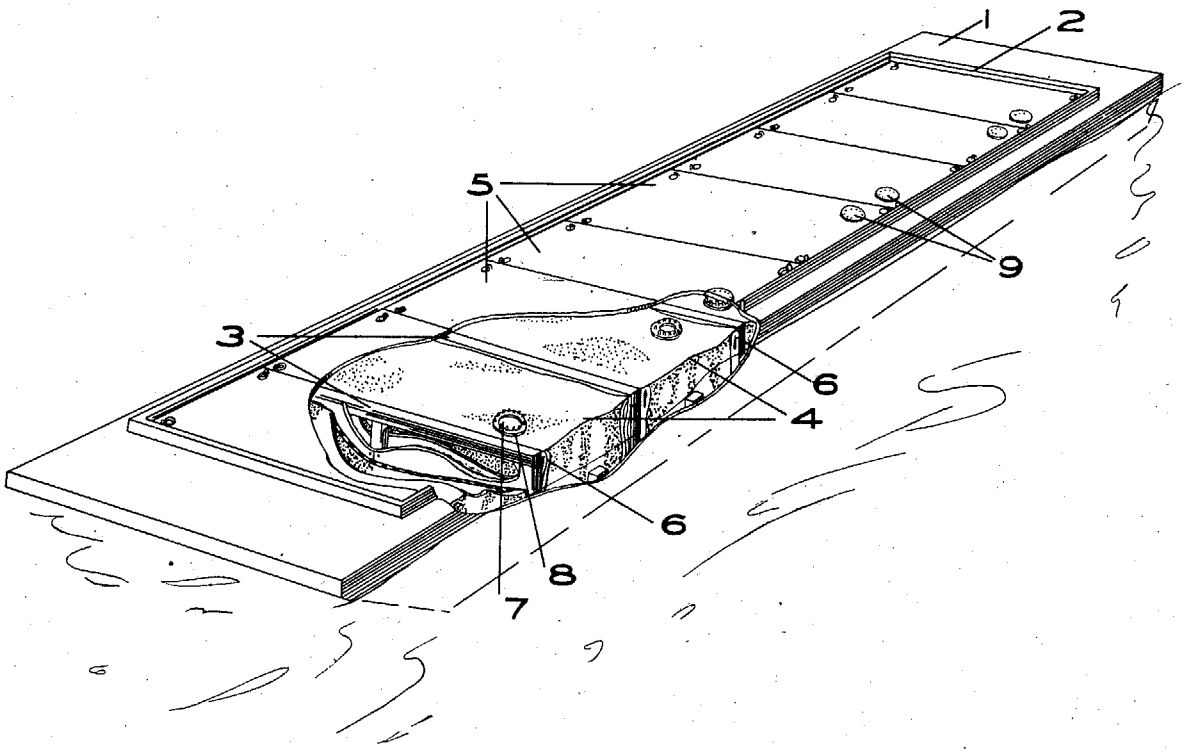
INVENTOR.
REID B. GRAY
BY JOSEPH C. DE WEESE
Donald W. Farrington
ATTORNEY Reissued May 13, 1947

Re. 22,876

UNITED STATES PATENT OFFICE 22,876

UTILIZATION OF CARGO SPACE IN SHIPS AND THE LIKE

Reid B. Gray, Dundalk, and Joseph C. De Weese, Essex, Md., assignors to The Glenn L. Martin Company, Middle River, Md., a corporation of Maryland Original No. 2,394,607, dated February 12, 1946, Serial No. 469,150, December 15, 1942. Application for reissue November 29, 1946, Serial No. 712,844

6 Claims. (Cl. 114—74)

This invention relates to the transportation of liquids, particularly hydrocarbon fluid in a simple and economical manner.

Heretofore, the transportation of liquids in cargo carriers such as boats has required boats of a specific construction, which construction would not permit the carrying of any other type of cargo.

An object of this invention is to adapt the cargo carrying space so that it may transport liquids and be readily converted for the transportation of dry cargo on a return or subsequent trip.

Another object of this invention is to provide boats that will transport liquid cargo in a very simple and inexpensively constructed craft.

This invention may be used in the form illustrated to convert the cargo carrying space of an ordinary freighter so that it may transport liquid cargo, such as oil or gasoline or it may be applied to specially constructed barges for use on inland water ways. These barges may be of wood or concrete or any other similar inexpensive material rather than the ordinary sheet metal construction that must be made fluid-tight.

Further and other objects will become apparent from the description of the accompanying drawing which forms a part of this disclosure and in which like numerals refer to like parts.

The drawing discloses a barge generally indicated as 1, which may be of wood plank or concrete construction. The cargo carrying hold 2 is divided up into compartments by partitions 3 which may be either temporary or permanent construction. These partitions together with the side walls of the barge form a rectangular compartment into which is placed a flexible fluid containing cell 4. The cover members 5 are supported on the partition and afford a protective cover for the compartments.

Strap members 6 are shown secured to each cell whereby the cells are supported in the compartment to prevent the collapse of the cell when empty. An opening 7 in the top of each cell registers with an opening in the cover member to provide access for filling and emptying the cell. A fitting 8 secures the edges of the openings together. Covers 9 are placed over the openings when not in use.

The cell used in carrying out this invention may be of any materials or construction which will render the cell sufficiently flexible and rugged so that it may be collapsed and stored in a relatively small space, and withstand handling and transportation. The materials of the cell which come in contact with the liquid must, of course, be inert to any chemical reaction with the liquid.

An example of a specific cell of the above specifications would be one comprising a layer or layers of fabric, impregnated with a liquid-proof plastic material. Where more than one layer of fabric is used, the impregnating plastic material would also act to bond the layers of fabric into a single flexible wall structure. The plastic materials must be such as will render the wall structure flexible and resistant to the chemical action of the liquid.

Suitable materials may be of the Perbunan or Thiokol RD type composed of co-polymers of acrylonitrile and butadiene, or hydrolysis products of co-polymers such as Resistoflex which is made up of polyvinyl alcohol and polyvinyl acetate. Condensation polymers, such as the Thiokols, which may be either of the ethylene dichloride or dichloroethyl ether type condensed with sodium polysulfide; or nylon which is a condensation product of adipic acid and hexamethylene diamine, may also be used.

In the event that the impregnating material used is not resistant to the action of the fluid carried in the cell, the above materials may be used as a lining for the cell.

The cell is shaped to conform with the shape of the cavity and while coated with a liquid-proof material must retain its flexibility for two reasons. As long as the cell is substantially equal to the size of the retaining compartment no stress will be placed upon the cell wall structure but all of the fluid load will be borne by the walls of the retaining structure. If the cell is slightly larger than the cavity, the stress is borne by the retaining walls. If the cell is slightly smaller than the cavity, the flexible wall is bulged outwardly and transmits the fluid pressure loads to the retaining walls. For successful operation, the walls of the cell must at all times be free from stress or stretch.

The reason for the flexibility of the cells is that upon reaching its destination and being unloaded, a liquid pay load may not be available for the return trip. In this case the cells may be removed from the compartments and rolled up and stowed in a small portion of the cargo carrying compartment. The partitions may or may not be removable, depending upon the construction, but if they are removable may also be stowed making available a large cargo carrying space for the return trip for a dry cargo.

The economy of this type of construction should be obvious with respect to carrying pay loads on each trip. Considerable economy is effected in this type of construction due to the fact that the boat construction itself does not have to be fluid tight as this feature is furnished by the cells. The invention is illustrated in a barge, several of which would be towed by a tug through inland water ways and afford a very economical means of transporting liquid and dry cargo in the same vessel. It should be obvious to those skilled in the art that this type of construction could readily be applied to any cargo carrier.

It is to be understood that certain changes, alterations, modifications and substitutions can be made without departing from the spirit and scope of the appended claims.

We claim as our invention:

1. In combination, a boat having a cargo carrying space, removable partitions dividing said space into a plurality of compartments, a flexible-walled, rubber-like liquid impervious cell placed in each of said compartments, substantially filling said compartments so that the walls of said compartments act as a retaining structure for said cells, securing means to support said cells on the walls of said compartments to prevent the collapse of certain flexible-walled cells when empty.

2. In combination, a boat having a cargo carrying space, removable partitions dividing said space into a plurality of compartments, a flexible-walled liquid impervious cell placed in each of said compartments, the walls of said compartments acting as retaining structure for said cells, securing means on said cells and compartment walls cooperating to support said cells from the walls of said compartments to prevent the collapse of said cells, the outer dimensions of said cell being substantially equal to the inner dimensions of said retaining structure whereby the fluid pressure load is borne by the compartment walls.

3. In a cargo carrying boat having temporary partitions arranged to divide the cargo space into a plurality of compartments, flexible walled, liquid impervious cells mounted in said compartments substantially filling said compartments so that the walls of said compartments retain said cell walls and bear the pressure load of the liquid within the cells, whereby the dry cargo space of the boat can be adapted to carry liquid cargo yet readily reconverted to carry dry cargo.

4. In a cargo carrying boat having removable partitions arranged to divide the cargo space into a plurality of compartments, flexible walled, liquid impervious cells mounted in said compartments, the walls of said compartments retaining said cell walls and bearing the pressure load within the liquid cells, the dimensions of said cell being such that the volumetric capacity of said cell, if filled out, but substantially unstretched, is greater than the volumetric capacity of the retaining structure.

5. In combination, a boat having a cargo carrying space, temporary partitions dividing said space into a plurality of compartments, a flexible-walled, liquid impervious cell placed in each of said compartments, securing means to support said cells from the walls of said compartments when empty, from collapse, an opening in each cell wall adjacent the top of said cell, cover members for each compartment, each cover member having an opening which registers with the opening in said cell wall, fitting members joining said openings furnishing access to the interior of said cells.

6. In combination, a transportation device having a cargo carrying space, removable partitions dividing said space into a plurality of compartments, a flexible-walled, liquid impervious cell placed in each of said compartments, the walls of said compartments acting as retaining structure for said cells, securing means on said cells and compartment walls cooperating to support said cells from the walls of said compartments to prevent the collapse of said cells, the outer dimensions of said cell being substantially equal to the inner dimensions of said retaining structure whereby the fluid pressure load is borne by the compartment walls.

REID B. GRAY.
JOSEPH C. DE WEESE.

REFERENCES CITED

The following references are of record in the file of this patent:

UNITED STATES PATENTS

| Number | Name | Date |
|---|---|---|
| 500,773 | Perelli-Minetti | July 4, 1893 |
| 1,970,610 | McMullen et al. | Aug. 21, 1934 |
| 2,102,590 | Gray et al. | Dec. 21, 1937 |
| 1,049,490 | Jack | Jan. 7, 1913 |
| 1,262,025 | Dickson | Apr. 9, 1918 |
| 1,519,941 | Sobeck | Dec. 16, 1924 |
| 2,160,870 | Jones | June 6, 1939 |
| 860,506 | Williams | July 16, 1917 |
| 929,139 | Kirchner | July 27, 1909 |
| 1,127,138 | West | Feb. 2, 1915 |
| | Connor ("Scow") | Oct. 14, 1835 |